May 23, 1944.  M. KNOBEL ET AL  2,349,736
METHOD AND APPARATUS FOR TESTING
Filed Oct. 28, 1940  2 Sheets-Sheet 1
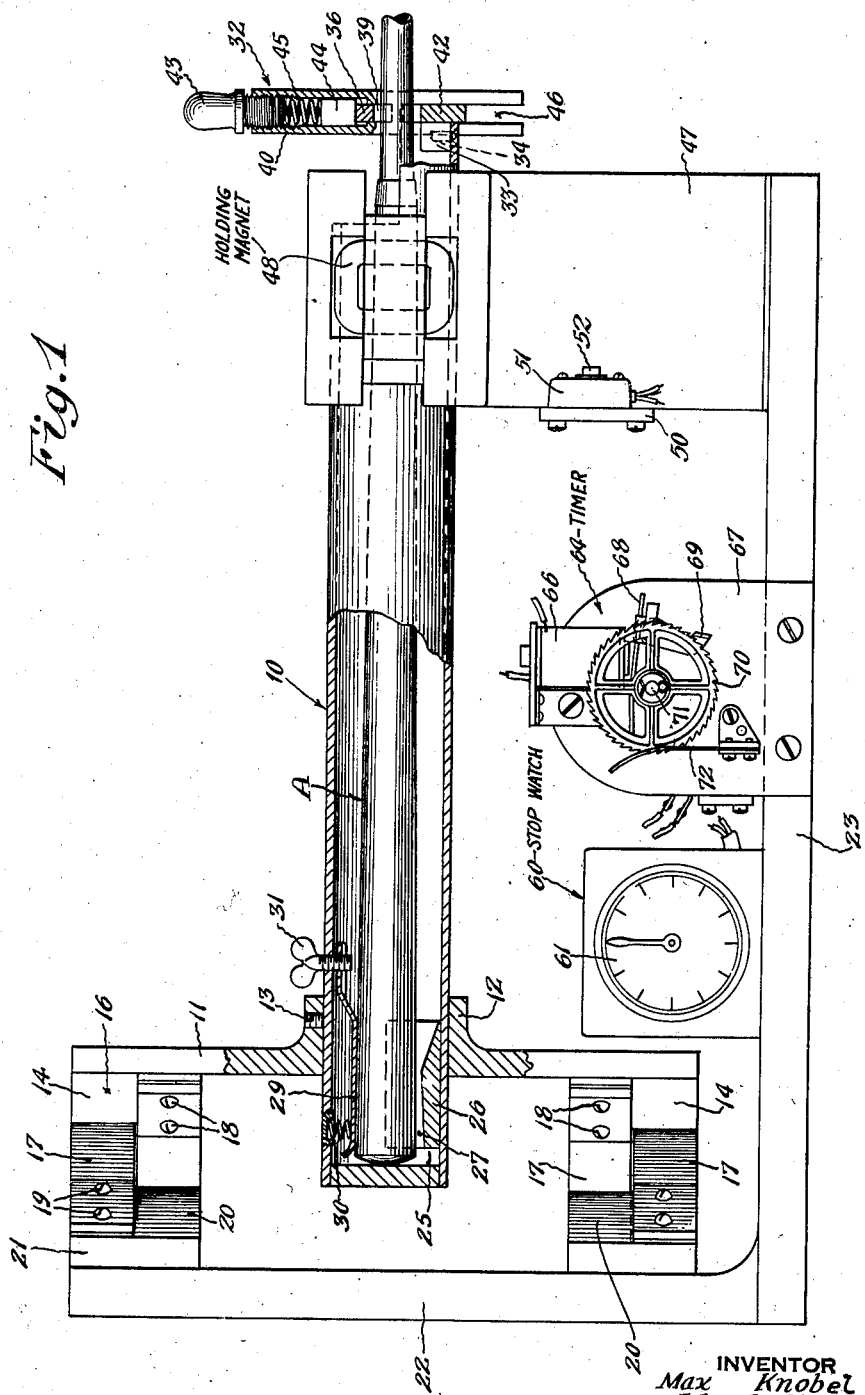
INVENTOR
Max Knobel
John B. Dickson
BY John W. Baymiller
Feyrer and Mack
ATTORNEYS May 23, 1944.  M. KNOBEL ET AL  2,349,736
METHOD AND APPARATUS FOR TESTING
Filed Oct. 28, 1940  2 Sheets-Sheet 2
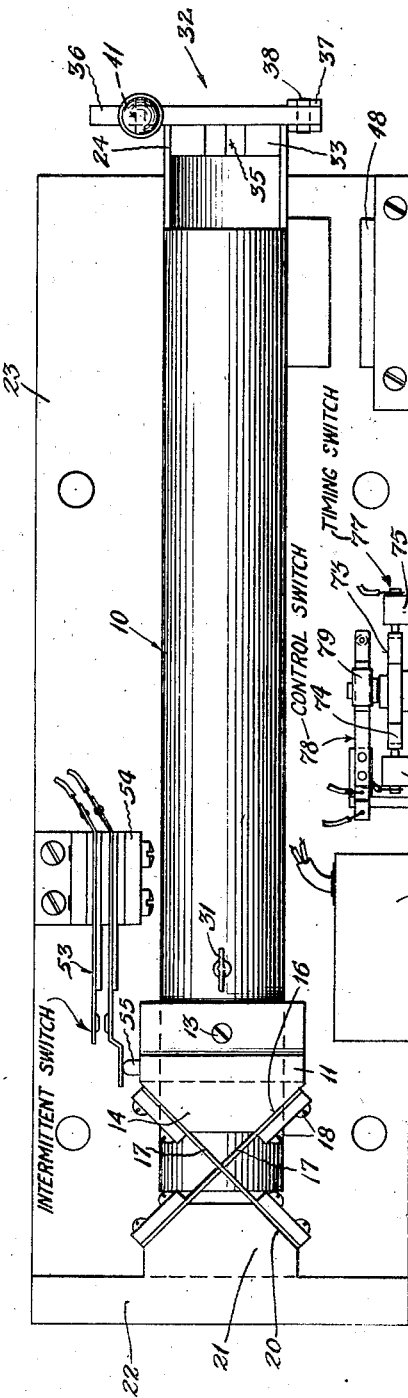
INVENTOR
Max Knobel
John B. Dickson
BY John W. Baymiller
Teyrer and Mack
ATTORNEYS Patented May 23, 1944

2,349,736

UNITED STATES PATENT OFFICE 2,349,736

METHOD AND APPARATUS FOR TESTING

Max Knobel, Arlington, John B. Dickson, Northampton and John W. Baymiller, Chicopee, Mass., assignors to A. G. Spalding & Bros. Inc., Chicopee, Mass., a corporation of Delaware Application October 28, 1940, Serial No. 363,130

21 Claims. (Cl. 73—51)

This invention relates to processes and machines for testing, and particularly for testing the dynamic balance of golf clubs and other sporting goods; and, to the electrical measurement of such testing.

Although the present process and apparatus has a wide variety of uses, as will be readily appreciated, for convenience it is illustrated and described herein for the testing and matching of golf clubs.

In order to attain a low score, or even to derive a reasonable satisfaction from the game of golf, an individual player should have a set of clubs, each one of which possesses a "feel" that that individual happens to like. A "matched" set of golf clubs is highly desirable.

Heretofore it has not been possible to accurately match clubs, and the players have complained that the "feel" of several of the clubs of a supposedly matched set was not satisfactory. These failures have resulted in spite of the efforts of the golf club manufacturers to carefully match clubs. Numerous tests adapted to indicate the balance of the club have been tried commercially. All have involved determining the leverage weight, or in other words all have involved a static balance test. Although a dynamic balance test for some playing implements has been proposed, it has not been used commercially. The latter proposed dynamic balance test has been considered to be impracticable for the manufacturing process because of the great amount of time and skill required for accurately making each test. No golf club dynamic balance testing machine detecting differences in the "feel factor" of rigid shafted clubs and of whippy shafted clubs has heretofore been available.

In the making of high quality clubs, such as those in registered or matched sets, the aim has been to keep such records that if a club were lost or broken and a player wished to replace it, a club having an identical head weight and other factors could be produced. To achieve this, it has been necessary to keep detailed records on each of a number of manufacturing operations because it was recognized that the leverage weight test was not a completely satisfactory test of the feel factor.

The present invention improves upon the usual matched sets by adding and insuring a substantially identical feel factor to a set of clubs.

It is an important object of the present invention to provide a method of testing golf clubs to accurately and simply measure the feel factor.

Other objects are:

To provide a golf club testing process and machine providing a commercially feasible dynamic balance test.

To provide a machine adapted to automatically measure the period of an oscillating member.

To provide a machine affording a convenient method of measuring the moment of inertia of a body.

To provide an electrical measuring device conveniently and accurately measuring a predetermined group of electrical impulses.

In accomplishing the aforementioned objects and other objects apparent from a reading of the specification, use is made of several features, among the most important of which are:

The use of counting mechanism controlling a switch to close an electrical circuit after a predetermined number of impulses and to reopen the electrical circuit after a predetermined additional number of impulses.

The use of automatic means for timing the period of oscillation of an oscillating member.

The use of such powerful resilient means for oscillating a sport implement that the shaft of the sport implement whips similarly to the manner in which it whips in play.

The use of a moment of inertia testing machine provided with a measuring instrument having a dial on which the moment of inertia is either read directly or read in units easily convertible into moment of inertia units.

The use of a scientifically determined center of oscillation for dynamically testing golf clubs and the like.

In the drawings:

Figure 1 shows a side elevation of the apparatus partly in section.

Fig. 2 is a top plan view of the apparatus shown in Fig. 1.

Fig. 3 is a fragmentary end view of the apparatus showing the clamping means.

Fig. 4 is a wiring diagram.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

The present preferred form of the invention, shown in Figs. 1 and 2, includes a horizontally disposed holder 10 in the form of a metal tube. There is provided a vertically extending plate 11 having a centrally disposed flange 12 having a hole adapted to receive the holder 10, which is held in place by means of set screws 13. At both the top and bottom of the plate 11 there are affixed mounting blocks 14 provided with machined surfaces 16 disposed angularly to each other, suitably at right angles. Flat metal springs 17 are attached to the machined surfaces 16 of the mounting blocks 14, as by means of screws 18 and are also attached by means of screws 19 to machined surfaces 20 of mounting blocks 21 attached to an upright 22 mounted upon a base 23. The projection of the springs upon the base is a cross, and the spring mounting assembly can suitably be called a flat knife edge spring mounting.

In the operation of the testing machine, the forward portion 24 of the holder 10 can be moved to a strained position, and then suddenly released from the strained position, thereby causing the holder to rapidly oscillate under the influence of the resilient means consisting of the springs 17. Because the springs are flat, and mounted both above and below the holder, the placing of weight in the holder does not cause the forward end of the holder to lower appreciably. The projection of the springs upon the base is a cross, and the geometric axis of the oscillation of the holder approximately coincides with the vertical line defined by the intersection of the lines of the cross.

The holder is provided with a rear clamp 25 consisting of a crotch member 26 having a notch 27 in which a golf club A or the like may be placed and held in position by means of a strip 29, the rear portion of which is yieldingly disposed toward the angular notch 27 of the crotch member 26 by means of a spring 30, and the forward portion of which is adjustably attached to the holder with a thumb screw 31.

In the operation of the rear clamp 25 the golf club A is slipped in the notch 27 and held in place by means of the spring 30 and strip 29 as shown in Fig. 1.

The holder 10 is provided with a front clamp 32 comprising a crotch member 33 attached to the holder with screws 34, said crotch member 33 having a notch 35 in which a golf club A or the like may be placed. A clamping member 36 is pivoted to a flange 37 of the crotch member for swinging about a pintle 38. The clamping member 36 is provided with a notch 39 adapted to receive and hold the shaft of a golf club, when the clamping member is swung down near the crotch member. A handle 40 is pivoted by means of a pin 41 to the flange 42 of the crotch member 33 opposite from the pintle 38 about which the clamping member 36 is pivoted. Within the handle 40 and between an adjusting bolt 43 and a pressure pin 44 is a spring 45 adapted to urge the pressure pin 44 against the clamping member 36 and to thereby cause the clamping member to grip the golf club A with an increased force. The handle is bifurcated to provide a slot 46 permitting the handle to swing over the clamping member and permitting the handle to straddle the flange of the crotch member.

In the operation of the front clamp 32 the golf club A, or the like, is placed in the notch 35 of the crotch member 33 and the clamping member 36 is swung downwardly about the pintle 38 and into the position shown in Fig. 3, so that the notches 35 and 39 cooperatively hold the golf club in position. The handle member 40 is then swung upwardly about the pin 41 and over the clamping member 36 and into the position shown in Fig. 3 so that the spring 45 operates to urge the pressure pin 44 against the clamping member to provide increased force for gripping the golf club.

Although the golf club A and holder 10 may be held in a strained position manually, the testing machine is preferably provided with means for maintaining the holder in a strained position. Near the forward end of the base 23 there is provided a standard 47 on which is mounted an electro-magnet 48 adapted to maintain the holder and golf club in a strained position.

In the operation of the holding means, the holder 10 is manually moved toward the electro-magnet 48 which, when energized, operates to maintain the holder in the strained position.

The testing machine is preferably provided with releasing means adapted to suddenly release the holder 10 from a strained position. There is provided a panel 50 which may be a separate unit, or, as shown, may be mounted upon the standard 47. Upon the panel 50 is mounted a single-pole single-throw switch 51 preferably of the push button type having a push button 52. The switch 51 is associated with the electro-magnet 48 so that when the push button 52 is depressed, the electro-magnet is energized, and when the push button is released, the electro-magnet is de-energized and the holder is suddenly released from its strained position and allowed to oscillate under the influence of the springs 17.

There is provided an intermittent switch 53 such as a single "make" contact spring switch which is usually open. The switch 53 may be conveniently mounted in such a manner that it is closed whenever the oscillating holder 10 is in the extreme position on one side and so that it is re-opened when the holder, in its return from the extreme position to the center position passes a predetermined slightly off-center position. In the form illustrated in Fig. 2 a conventional contact spring switch 53 is mounted upon a switch standard 54 affixed to the base 23 in an off-center position, and the holder is provided with a fiber projection 55 adapted to function as a push pin in cooperation with the contact springs to close the switch each time the holder, in its oscillations, moves outwardly from the center position and past a predetermined off-center position, and to keep the switch closed while the holder moves to and from the extreme position, and to re-open the switch as the holder passes the predetermined slightly off-center position during its movement toward center position. A condenser 56 and high resistance element 57 may be mounted wherever convenient, as for example, and as shown in the drawing upon the switch standard 54. The resistance element 57 and condenser 56 are electrically shunted across the switch.

Mounted upon the base 23 is a stop watch 60, suitably an electric stop watch, such as Model S-1 manufactured by the Standard Electric Time Co. A dial 61 of the stop watch 60 is preferably but not necessarily marked off according to units of moment of inertia, and calibrated with the dial reading for the holder 10 marked as zero, so that the dial reading shows in moment-of-inertia units the measured moment of inertia of the object being tested. The stop watch is provided with an electric clutch 62 associated with a continuously running synchronous motor 63 connected across a source of A. C.

Counting mechanism 64 such as a stepping switch, and for example, model 0023-100 L manufactured by the S. H. Couch Co., Norfolk Downs, Massachusetts, is mounted upon the base 23.

An electro-magnet 66 is mounted upon a frame 67. Associated with the electro-magnet 66 is an armature 68 having at one end a pawl 69 adapted to engage a ratchet gear 70 mounted on a shaft 71 passing through the frame 67 of the counting mechanism 64. The ratchet gear 70 may have, for example, 108 teeth so that the shaft 71 and affixed parts rotate 3⅓ degrees per step. A coil spring 65 is associated with the shaft 71 so as to return the ratchet gear 70 to its starting position whenever a detent 72 is released.

Positioned on the opposite side of the frame 67 mounted for rotation with the shaft 71 is a Bakelite disc 73 having a brass segment 74 constituting 246⅔ degrees of the circumference of the Bakelite disc 73. Mounted on and electrically insulated from the frame 67 is a brush 75 positioned 8⅓ degrees from one end of the segment 74. Positioned 180 degrees from the brush 75 or in other words diametrically across the Bakelite disc from the brush 75, is a second brush 76 mounted upon and electrically insulated from the frame 67. The disc 73, segment 74, and brushes 75 and 76 constitute a timing switch 77.

A control switch 78 may suitably but not necessarily be used, which control switch 78 may be attached to and electrically insulated from the frame 67 and positioned behind the brushes 75 and 76. Mounted upon and for rotation with the shaft 71 is a cam 79 adapted to open the normally closed contact spring control switch 78 at the same time, or within a few steps after, segment 74 breaks electrical connection with the brush 76 to open the timing switch 77.

In the operation of the timing switch 77 the electro-magnet 66 is intermittently energized, thereby intermittently attracting the armature 68, thereby actuating the pawl 69, hereby rotating the ratchet gear 70 a step at a time. The segment 74 mounted upon the Bakelite disc 73 affixed to the shaft 71 for rotation with the ratchet gear 70 advances 8⅓ degrees to thereby form an electrical connection between the oppositely disposed brushes 75 and 76, thereby closing the timing switch 77. After twenty additional impulses have caused the ratchet gear 70 to rotate 66⅔ degrees additionally, the brush 76 is electrically disconnected from the segment 74, thereby opening the timing switch 77. The counting mechanism 64 can be returned to the normal starting position by manually releasing the detent 72.

In the operation of the control switch 78, the electro-magnet 66 causes the shaft 71 to rotate step-by-step until the timing switch 77 re-opens, at which time or within a few steps thereafter, the cam 79 causes the normally closed contact spring switch 78 to open.

In Fig. 4 is shown a wiring diagram of the testing machine. Direct current source D. C. operates the electro-magnet 48 to maintain the holder 10 in a strained position until the push button of the switch 51 is released, at which time the holder starts oscillating. The intermittent circuit is closed by the oscillations of the holder actuating the intermittent switch 53. A condenser 56 and a high resistance element 57 are shunted across the intermittent switch 53 to prevent the contacts from sparking. Each time the intermittent switch 53 is closed, the electro-magnet 66 is energized, and the pawl 69 rotates the ratchet gear 70 and associated elements a unitary amount. After two and one-half oscillations, the timing switch 77 is closed by the brass segment 74 touching both of the brushes 75 and 76 thereby energizing the clutch magnet 62 to initiate the operation of the stop watch 60.

After the stop watch 60 has operated during twenty oscillations of the holder 10 the timing switch 77 is opened and concurrently the cam 79 causes the control switch 78 to open so that additional oscillations of the holder 10 will not unduly advance the counting mechanism 64.

As soon as the operator desires to make another test, the detent 72 can be released to allow the coil spring 65 to return the ratchet gear 70 and related parts to the starting position, thereby closing the control switch 78.

If the springs 17 influencing the oscillation of the holder 10 have suitable characteristics, so that there is no danger of the holder continuing to oscillate long enough to reclose the timing switch 77 during an individual test, the control switch 78 need not be used. If the operator manually stops the oscillations of the holder 10 after the stop-watch 60 has stopped, the control switch 78 need not be used. If the springs 17 have suitable characteristics, the timing switch 77 may be closed after fewer than two and one-half oscillations of the holder, the purpose of the switching being to provide an accurate timing of the period of oscillation, free from errors due to starting or stopping transients. If the springs 17 have suitable characteristics, the moment of inertia of a golf club as determined by the testing machine will be exactly the same as the moment of inertia determined by any other accurate scientific method. However, if the springs are powerful enough to cause the golf club shaft to whip, then the property measured by the testing machine is related to and somewhat dependent upon, but not exactly equal to, the moment of inertia.

It has been found that it is not necessary to whip the shaft as much as a shaft is whipped in actual play, and that even a very small amount of whip greatly increases the accuracy of the appraisal of the feel factor, and by experimentally determining the proper strength of springs for a given machine, it is possible to obtain a substantially perfect accuracy. When a group of clubs is tested upon such a machine, the relative feel factors thus determined by the testing machine are substantially identical with the appraisal of the feel factors of that group of clubs by typical golfers. There have been many golf club testing machines, but it has not heretofore been possible to use a machine for testing golf clubs to produce the identical appraisal achieved by players testing and using the clubs.

In the development of one testing machine, it was found that when the empty holder 10 was allowed to oscillate for twenty oscillations, the stop watch 60 recorded 4.21 seconds, which corresponded to a moment of inertia of approximately 350 pounds-inches squared. It was found that when a golf club was placed in the holder and tested, the stop watch ordinarily recorded from 6.70 to 7.10 seconds, corresponding to a moment of inertia for the golf club of from about 1020 pounds-inches squared to about 1145 pounds-inches squared. It was found that the moment of inertia of the object being tested could be read directly from the dial of the stop watch by marking off the dial of the stop watch in units of pounds-inches squared, and by setting the point corresponding to the moment of inertia of the empty holder as zero.

As will be noted in the drawings, the holder 10 may be adjusted inwardly and outwardly with respect to the plate 11 by means of the set screw 13. The holder is preferably adjusted so that the geometric axis of oscillation does not pass through the golf club shaft, but instead passes through a geometric line constituting the imaginary extension of the shaft. Substantially all golf-club testing methods heretofore proposed have utilized the testing of balance about a point on the golf club shaft one or two inches from the end.

An important point, and one leading to great accuracy with the present process and apparatus, consists of fixing the center about which the moment is to be determined by a scientific procedure instead of by guess.

It has been found that the instantaneous center for the movement of a golf club may be determined from geometric calculations involving multiflash photographs of a golf club swing. We have found that over short sections of the swing the path is reasonably close to being circular. Therefore, instead of drawing tangents to the path of the club we assume that the chord between two points is parallel to the tangent that would be drawn to a mid-point on the actual path between the two points. Thus we draw chords to two pairs of points on the golf clubs and erect perpendicular bisectors to the chords. The intersection of the two perpendicular bisectors is the mean instantaneous center of the two club positions used.

By extensive research, and with the aid of multi-flash pictures of such golf experts as Bobby Jones, during a typical swing or stroke, it has been found that the instantaneous center during the golf club swing is generally at a point beyond the upper end of the golf club shaft, and that its exact location varies as the club is swung. At the instant when the club hits the ball, or, in other words, when the club has the greatest power, and therefore is most sensitive to relative imperfections in physical properties related to moment of inertia, the instantaneous center of the club may be from ⅛ of an inch to 2½ inches beyond the end of the club shaft, depending upon the individual player and other variables. Determining the average instantaneous center during the greatest time interval of the club swing resulted in approximately the same values.

It has been found that a reasonably accurate appraisal of the instantaneous center which governs the "feel" of a golf club is approximately 1¾ inches beyond the end of the golf club shaft, but as pointed out heretofore, it may be from ⅛ to 2½ inches without developing excessive inaccuracy. For clubs other than golf, multiflash photos might show that the scientific determination of the correct instantaneous center was on the club shaft instead of on the extension thereof. The holder 10 is adjustable with respect to the plate 11 for oscillation about a point on a playing implement shaft.

In the operation of the machine, a golf club is placed in the holder 10 and the handle 40 is raised over the clamping member 32. The push button 52 is depressed and the holder moved toward the energized electro-magnet 48. The detent 72 is released to allow the counting mechanism 64 to return to the starting position. The push button 52 is released and the holder 10 allowed to oscillate. After about seven seconds, the hand of the stop watch 60 points out the feel factor of the golf club. The stop watch may be returned to the starting position, and the golf club removed from the holder, and another golf club tested as above described. A skilled operator can test a large number of golf clubs per hour by this method, especially if he operates several machines simultaneously.

Numerous variations can be made without departing from the teaching of the present invention, and the description is intended as one of illustration rather than of limitation.

Having thus described the invention, what is claimed as new is:

1. In a testing apparatus the combination of a base; a holder; resilient means normally supporting said holder in a neutral position upon the base and enabling movement of said holder in opposite axial directions into opposed strained positions relative to said neutral position; and means for maintaining said holder in one of said strained positions displaced from said neutral position.

2. In a testing apparatus the combination of a base; a holder; means pivotally supporting said holder on said base for oscillatory movement; timing mechanism; counting mechanism; and electrical means associating said timing and counting mechanisms with each other and with said holder for timing and counting a predetermined number of oscillations of said holder.

3. In a testing apparatus the combination of a base; a holder; opposed springs pivotally supporting said holder on said base; a counter mechanism; and means associating said counter mechanism with said holder.

4. In a testing apparatus the combination of a base; a holder oscillatorily supported on the base; a delayed timing and counting mechanism for timing and counting oscillations of the holder; and means associating said last-named mechanism with said holder.

5. In a testing apparatus the combination of a base; a holder; means associating the base and holder adapted to oscillate the holder when it is released from a strained position; means for maintaining said holder in the strained position; counting mechanism for indicating the number of oscillations of said holder; and controlling means for releasing the holding means and for initiating the counting means.

6. In a testing apparatus the combination of a base; a holder; means associating the base and holder, adapted to oscillate the holder when released from a strained position; counter mechanism for counting oscillations of said holder; timing mechanism for timing a predetermined number of oscillations; means for maintaining said holder in the strained position; and means for releasing said holding means and for concurrently initiating said counting mechanism.

7. In a testing apparatus the combination of a base; a holder; means associating said holder and said base adapted to oscillate the holder when released from a strained position; electrical counter mechanism for counting oscillations of said holder; electrical timing mechanism for timing a predetermined number of oscillations; electrical means for maintaining said holder in the strained position; and means for releasing said holding means and for concurrently initiating said electrical counting mechanism and said timing mechanism.

8. In a testing apparatus the combination of a base; a holder oscillatorily supported on the base; counting mechanism for counting oscillations of said holder; timing mechanism; electrical means controlled by said holder for operating said counting mechanism; and means actuated by the counting mechanism adapted to control the timing mechanism.

9. In a testing apparatus the combination of a base; a holder; resilient means oscillatorily supporting said holder on said base; mechanism for counting the oscillations of the holder; timing mechanism; and means controlled by the counting mechanism for initiating the timing at a predetermined period in the oscillation of the holder.

10. In a testing apparatus the combination of a base; a holder; resilient means oscillatorily supporting said holder on said base; mechanism for counting the oscillations of the holder; timing mechanism; means controlled by the counting mechanism for initiating the timing means at a predetermined period in the oscillation of the holder; and means for maintaining said holder in a strained position.

11. In a testing apparatus the combination of a base; a holder; resilient means oscillatorily supporting said holder on said base; counting mechanism actuated upon oscillation of said support; timing mechanism; and electrical means for concurrently initiating the timing and counting means at a predetermined period in the oscillation of the holder.

12. In a testing apparatus the combination of a base; a holder; means associating said base and said holder adapted to oscillate the holder when it is released from a strained position; counting mechanism for counting oscillations of said holder; timing mechanism for timing a predetermined number of oscillations; and means for starting and stopping said timing and counting mechanisms at predetermined periods in the oscillation of said holder.

13. A machine for testing the feel factor of a sport implement comprising a sport implement holder; resilient means oscillatorily supporting the holder; an electrical measuring means; and means associating the electrical measuring means and the holder so that the electrical measuring means is responsive to the nature of the oscillations of the holder.

14. A sport implement testing machine comprising a holder; means associated with said holder and adapted to oscillate the holder when released from a strained position; measuring means; and means associating the oscillating holder and measuring means, controlled by oscillation of said holder and adapted to operate the measuring means only during a predetermined group of oscillations.

15. In a testing machine the combination of a first electrical circuit including a source of electrical energy, an electrical measuring means having an indicator, and switching means adapted to operate the measuring means only when closed; a second electrical circuit including another source of electrical energy, an intermittent switch actuated incident to the test adapted to intermittently pass electrical impulses, and an electromagnetic device actuated by said intermittent impulses; and means associating said electromagnetic device and the measuring means switching means to close the first circuit after a predetermined number of electrical impulses, and to open said circuit after an additional predetermined number of said impulses to indicate directly on the electrical measuring means the result of the test.

16. In a testing apparatus the combination of a base; a holder; resilient means oscillatorily supporting said holder on said base for oscillatory movement relative to an axis of oscillation; means enabling adjustment of said holder transversely relative to said axis of oscillation; counting mechanism for counting oscillations of said holder; and means associating said counter mechanism and said holder.

17. The process of testing implements having flexible shafts to determine the dynamic movement of inertia thereof which includes the steps of oscillatorily supporting said shaft adjacent one end thereof, forcibly deflecting the other end and releasing the same for oscillating said implement; simultaneously starting a timing and an oscillation counting operation after a stabilized oscillatory condition is established; stopping the counting operation at a predetermined total; and determining the time interval for said counting operation.

18. The process of measuring the moment of inertia of a golf club or the like having a flexible shaft consisting of supporting the club by the end of the shaft in a holder of which the moment of inertia and period of oscillation are known; oscillating the holder and club; initiating a timing operation after a predetermined number of oscillations, to thereby avoid inaccuracies incident to starting transients; immediately stopping the timing operation after an additional predetermined number of oscillations; and determining the index of the moment of inertia of the club from the time interval during the timing operation.

19. The process of testing implements having a flexible shaft to determine the dynamic moment of inertia of said implement, the steps of supporting the shaft adjacent one end, forcibly deflecting the free end of the shaft and releasing the same to set up oscillations therein, the initial oscillations being utilized to stabilize the oscillatory condition; and simultaneously counting and timing said oscillations through a succeeding predetermined period.

20. The process of testing implements having a flexible shaft to determine the moment of inertia of said implement, the steps of supporting the shaft adjacent one end, forcibly deflecting the free end of the shaft and releasing the same to set up oscillations therein, the initial predetermined number of oscillations being untimed; and subsequently timing a predetermined number of oscillations.

21. The method of testing and matching a set of golf clubs of different types each having a flexible shaft, the steps of individually oscillatorily supporting a plurality of clubs of the different types adjacent one end of the shaft; applying a similar force to the free end of each of the shafts to deflect the same; releasing said shafts to set up oscillations therein, the initial predetermined number of oscillations being untimed to provide a stable condition of oscillation; timing a predetermined number of subsequent oscillations to provide an index; and selecting a club of each type having the same index whereby a matched set of clubs having the same "feel" is obtained.

MAX KNOBEL.
JOHN B. DICKSON.
JOHN W. BAYMILLER.